United States Patent
Jeong et al.

(10) Patent No.: US 9,461,786 B2
(45) Date of Patent: Oct. 4, 2016

(54) METHOD AND APPARATUS FOR ALLOCATING INTERFERENCE CANCELLATION CODE FOR INTER-BASE STATION COORDINATED COMMUNICATION IN RADIO COMMUNICATION SYSTEM

(71) Applicant: Samsung Electronics Co., Ltd, Gyeonggi-do (KR)

(72) Inventors: Su-Ryong Jeong, Yongin-si (KR); Jeong-Ho Park, Seoul (KR); Jae-Weon Cho, Gyeonggi-do (KR); Hyun-Kyu Yu, Gyeonggi-do (KR)

(73) Assignee: Samsung Electronics, Inc., Suwon-si (KR)

( * ) Notice: Subject to any disclaimer, the term of this patent is extended or adjusted under 35 U.S.C. 154(b) by 46 days.

(21) Appl. No.: 14/091,180

(22) Filed: Nov. 26, 2013

(65) Prior Publication Data
US 2014/0148182 A1    May 29, 2014

(30) Foreign Application Priority Data

Nov. 26, 2012  (KR) .................. 10-2012-0134315

(51) Int. Cl.
*H04L 27/00* (2006.01)
*H04L 5/00* (2006.01)
(Continued)

(52) U.S. Cl.
CPC ............. *H04L 5/0026* (2013.01); *H04B 7/024* (2013.01); *H04J 11/0053* (2013.01); *H04J 13/0048* (2013.01); *H04J 13/18* (2013.01); *H04L 1/0003* (2013.01); *H04L 1/0009* (2013.01); *H04L 1/0025* (2013.01); *H04L 5/0035* (2013.01);
(Continued)

(58) Field of Classification Search
CPC . H04L 5/0026; H04L 5/0035; H04L 5/0094;
H04L 5/0073; H04L 25/4902; H04L 1/0003;
H04L 1/0009; H04B 3/54; H04B 7/043;
H04B 7/0465; H04B 7/024; H04W 36/18;
H04W 72/082; H04J 11/0053; H04J 13/0048;
H04J 13/18
See application file for complete search history.

(56) References Cited

U.S. PATENT DOCUMENTS

2001/0034236 A1*  10/2001  Tong et al. ................... 455/450
2004/0081227 A1    4/2004  Lim et al.
(Continued)

FOREIGN PATENT DOCUMENTS

JP    2003-283394    10/2003
JP    2008-104174    5/2008
(Continued)

OTHER PUBLICATIONS

International Search Report dated Feb. 13, 2014 in connection with International Application No. PCT/KR2013/010799, 3 pages.
(Continued)

*Primary Examiner* — Syed Haider

(57) ABSTRACT

The present disclosure provides a method for allocating a code for inter-Base Station (BS) coordinated communications in a radio communication system. The method includes grouping terminals, at least more than a predetermined number of whose transmit and receive beams indicated by the terminals' respective favorite beam configuration information correspond to each other, in a same group; and allocating unique codes to terminals in the same group and sending information regarding the allocated code to each of the terminals.

24 Claims, 10 Drawing Sheets

(51) Int. Cl.
*H04B 7/02* (2006.01)
*H04J 11/00* (2006.01)
*H04J 13/00* (2011.01)
*H04J 13/18* (2011.01)
*H04L 1/00* (2006.01)
*H04B 7/06* (2006.01)

(52) U.S. Cl.
CPC ........... H04L 5/0073 (2013.01); H04L 5/0094 (2013.01); H04B 7/0617 (2013.01); H04L 5/0046 (2013.01)

(56) References Cited

U.S. PATENT DOCUMENTS

| | | | |
|---|---|---|---|
| 2004/0082356 A1* | 4/2004 | Walton | H04B 7/022 455/522 |
| 2004/0179544 A1* | 9/2004 | Wilson | H01Q 1/246 370/442 |
| 2004/0213187 A1* | 10/2004 | Fujil | H04B 7/0408 370/335 |
| 2005/0153657 A1 | 7/2005 | Maruta | |
| 2007/0249402 A1 | 10/2007 | Dong et al. | |
| 2008/0084350 A1 | 4/2008 | Uno et al. | |
| 2008/0219194 A1 | 9/2008 | Kim et al. | |
| 2009/0111473 A1* | 4/2009 | Tao | H04W 36/18 455/440 |
| 2009/0310586 A1* | 12/2009 | Shatti | H04B 7/026 370/338 |
| 2010/0033374 A1* | 2/2010 | van Rensburg | H01Q 1/246 342/368 |
| 2010/0279619 A1* | 11/2010 | Yeh | H04B 7/024 455/63.1 |
| 2011/0014915 A1* | 1/2011 | Chen | H04W 72/048 455/437 |
| 2011/0249597 A1* | 10/2011 | Papadopoulos | 370/280 |
| 2012/0320837 A1* | 12/2012 | Kim et al. | 370/329 |
| 2013/0017855 A1* | 1/2013 | Hui | H04W 16/28 455/522 |
| 2013/0163544 A1* | 6/2013 | Lee | H04W 72/04 370/329 |

FOREIGN PATENT DOCUMENTS

| | | |
|---|---|---|
| KR | 10-2004-0036821 | 5/2004 |
| KR | 10-2009-0079176 | 7/2009 |
| WO | WO 02/35857 A1 | 5/2002 |

OTHER PUBLICATIONS

Written Opinion of the International Searching Authority dated Feb. 13, 2014 in connection with International Application No. PCT/KR2013/010799, 5 pages.

Extended European Search Report dated Jun. 14, 2016 in connection with European Application No. 13857138.5, 7 pages.

* cited by examiner

Table 1

| MCS(4bit) | Reduced MCS(3bit) | MCS format | Code Rate |
|---|---|---|---|
| 0 |  | QPSK 1/2 8repetition | 0.1250 |
| 1 |  | QPSK 1/2 4repetition | 0.2500 |
| 2 |  | QPSK 1/2 2repetition | 0.5000 |
| 3 | 0 | QPSK 1/2 1repetition | 1.0000 |
| 4 | 1 | QPSK 2/3 | 1.3333 |
| 5 | 2 | QPSK 3/4 | 1.5000 |
| 6 | 3 | QPSK 4/5 | 1.6000 |
| 7 | 4 | 16QAM 1/2 | 2.0000 |
| 8 |  | 16QAM 2/3 | 2.6667 |
| 9 | 5 | 16QAM 3/4 | 3.0000 |
| 10 |  | 16QAM 4/5 | 3.2000 |
| 11 | 6 | 64QAM 2/3 | 4.0000 |
| 12 |  | 64QAM 2/3 | 4.5000 |
| 13 | 7 | 64QAM 4/5 | 4.8000 |
| 14 |  | 64QAM 5/6 | 5.0000 |
| 15 |  | 64QAM 7/8 | 5.2500 |

Table 2

| Reduced MCS(3bit) | No Repetition Code Rate | Code Rate Changed to Walsh Extension | | | |
|---|---|---|---|---|---|
|  |  | length2 walsh code | length4 walsh code | length8 walsh code | length16 walsh code |
| 0 | 1.0000 | 0.5000 | 0.2500 | 0.1250 | 0.0625 |
| 1 | 1.3333 | 0.6667 | 0.3333 | 0.1667 | 0.0833 |
| 2 | 1.5000 | 0.7500 | 0.3750 | 0.1875 | 0.0938 |
| 3 | 1.6000 | 0.8000 | 0.4000 | 0.2000 | 0.1000 |
| 4 | 2.0000 | 1.3333 | 1.3333 | 1.3333 | 1.3333 |
| 5 | 3.0000 | 1.5000 | 0.7500 | 0.3750 | 0.1875 |
| 6 | 4.0000 | 2.0000 | 1.0000 | 0.5000 | 0.2500 |
| 7 | 4.8000 | 2.4000 | 1.2000 | 0.6000 | 0.3000 |

FIG.6

METHOD AND APPARATUS FOR ALLOCATING INTERFERENCE CANCELLATION CODE FOR INTER-BASE STATION COORDINATED COMMUNICATION IN RADIO COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed on Nov. 26, 2012 in the Korean Intellectual Property Office and assigned Serial No. 10-2012-0134315, the entire disclosure of which is incorporated hereby incorporated by reference.

TECHNICAL FIELD

The present disclosure relates to a method and apparatus for allocating interference cancellation codes to terminals in cell coverage boundaries through inter-base station coordinated communication in a communication system.

BACKGROUND

Modern communication systems are developing to support higher data rate to satisfy the demand for steadily increasing wireless data traffic. For example, fourth generation wireless communication systems are seeking to improve spectral efficiency to increase data rates.

However, merely improving the spectral efficiency is not enough to satisfy the demand for the soaring wireless data traffic. Accordingly, communications systems have been developed to keep up with the growing trend of securing new communication frequency bands and especially communication frequency bands at higher frequencies than 10 GHz, below which a wide frequency band is hardly secured.

However, the higher the transmission frequency for wireless communication, the shorter the propagation range, which causes reduction of service coverage. Therefore, a need exists for application a beamforming technology to the wireless communication system.

SUMMARY

The present disclosure a method and apparatus for grouping terminals expected to suffer from inter-base station interference and allocating unique Walsh codes to terminals in the same group, in Co-Ordinated Multi-Point (CoMP) communications.

The present disclosure also provide a method and apparatus for applying symbol repetition and Walsh encoding based on the code length of Walsh codes on the frequency axis in allocating coordinated transmission resources to a group of terminals expected to suffer from inter-base station interference.

An aspect of the present disclosure is to provide a method for allocating a code for inter-Base Station (BS) coordinated communications in a radio communication system. The method includes grouping terminals into a same group, wherein the terminals include at least more than a predetermined number, wherein the terminals transmit and receive beams indicated by favorite beam configuration information of the terminals, wherein the transmit and receive beams correspond to each other; and allocating unique codes to terminals in the same group and sending information regarding the allocated code to each of the terminals.

Another aspect of the present disclosure is to provide a method for allocating a code for inter-Base Station (BS) coordinated communications in a radio communication system. The method includes: configuring favorite beam configuration information with combinations of transmit and receive beams mapped to signals received from BSs that sent a DownLink (DL) reference signals, wherein the DL reference signal received signal strength is equal to or higher than a threshold and sending the favorite beam configuration information to a serving BS that controls coordinated communications; and receiving from the serving BS grouping information indicating that a terminal is included in a group to which same resources are allocated within a coordinated communication cell and code information regarding uniquely allocated code for the terminal.

Another aspect of the present disclosure is to provide an apparatus for allocating a code for inter-Base Station (BS) coordinated communications in a radio communication system. The apparatus includes a receiver configured to obtain respective favorite beam configuration information of terminals; a resource allocation unit configured to group terminals in a same group and configured to allocate a unique code to each of the terminals in the same group, wherein the terminal include at least more than a predetermined number, wherein the terminals transmit and receive beams indicated by their respective favorite beam configuration information, and wherein the transmit and receive beams correspond to each other; wherein each of the terminals in the same group is allocated a unique code and a transmitter configured to transmit information regarding the allocated code to each of the terminals.

Another aspect of the present disclosure is to provide an apparatus for allocating a code for inter-Base Station (BS) coordinated communications in a radio communication system. The apparatus includes a controller configured to generate favorite beam configuration information with combinations of transmit and receive beams mapped to signals received from BSs that sent a DownLink (DL) reference signals, wherein the DL reference signal received signal strength is equal to or higher than a threshold; a transmitter configured to send the favorite beam configuration information to a serving BS that controls coordinated communications; and a receiver configured to receive the DL reference signals and configured to receive from the serving BS grouping information indicating that a terminal is included in a group to which same resources are allocated within a coordinated communication cell and code information regarding uniquely allocated code for the terminal.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 shows a table representing an example embodiment of an ordinary MCS level set and a reduced MCS level set according to this disclosure;

Throughout the drawings, like reference numerals will be understood to refer to like parts, components, and structures.

DETAILED DESCRIPTION

Figure 1:
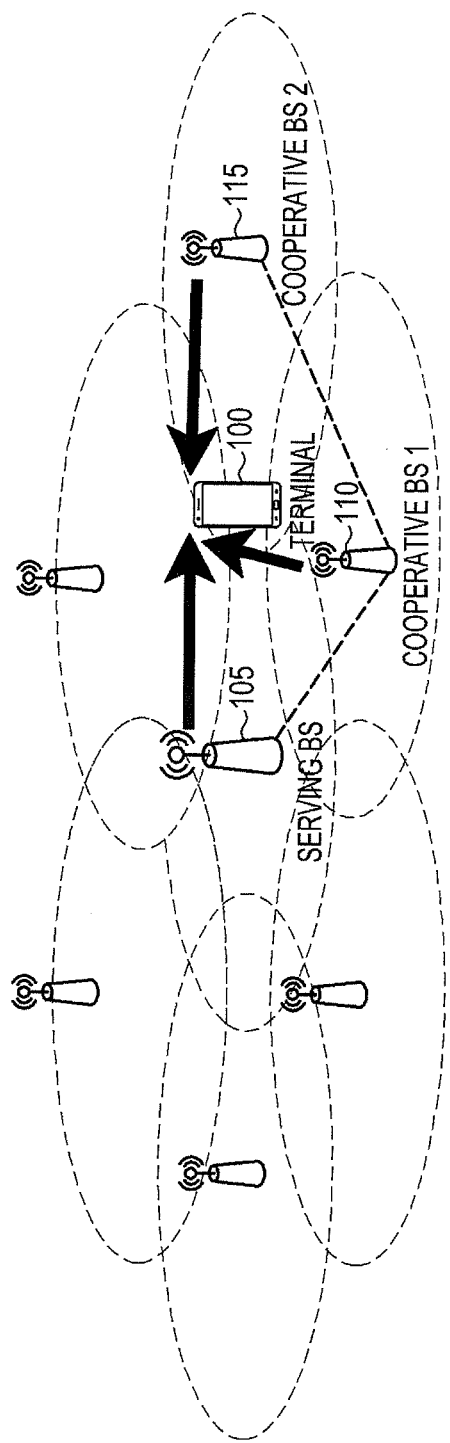
FIG. 1 illustrates an example embodiment of a cloud cell according to this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. The disclosure now will be described more fully hereinafter with reference to the accompanying drawings, in which illustrative embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

It will be understood that, although the terms first, second, third, and the like, may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~and/or~," or the like.

The terminology used herein is for the purpose of describing particular embodiments only and is not intended to be limiting of the disclosure.

It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to the principles of the present disclosure, a system, method, and apparatus is configured to provide efficient scheduling for Co-Ordinated Multi-Point (COMP) communication in a wireless communication system (also referred to as 'BeamForming (BF) system'). Furthermore, according to the principles of the present disclosure, a system, method, and apparatus is configured to transmit or receive signals between base stations (BSs) and terminals to perform scheduling.

Generally, beamforming increases a radio propagation range and can be classified into transmit beamforming and receive beamforming. Transmit beamforming can be implemented by a transmitter to transmit signals to a particular point such as a focus point using multiple antennas. Multiple antennas can be grouped into a set defined as an antenna array. Each antenna of the antenna array can be called an "array element". Transmit beamforming not only increases the radio propagation range but also reduces interference with neighboring cells because signal strengths at points other than the focus point can be weak. The receive beamforming uses the antenna array on a receiver's side (such as a receiver antenna array). The receive beamforming is also used by the receiver to receive signals by focusing at a particular point of radio receivable areas, thereby increasing a radio reception range and reducing the reception gain of a transmitted signal in other points than the focus point, thereby reducing interference with neighboring cells.

As discussed above, the beamforming technology artificially suppresses interference, thus leading to improvement of Signal-to-Noise Ratio (SNR) of a received signal. Generally, with existing radio communication systems, a terminal receives a clear signal from a single base station (BS). However, a terminal can apply the beamforming technology to get clear signals from one or more BSs. Specifically, a terminal can access one or more BSs simultaneously and selectively transmit or receive a signal from a better BS at every point in time.

According to the principles of the present disclosure, an exemplary embodiment of a radio communication system includes multiple BSs in cooperation with each other to provide a coordinated service (hereinafter, referred to as 'coordinated communication') to a terminal.

According to the principles of the present disclosure an exemplary embodiment of a cell providing the coordinated communication (hereinafter, referred to as 'coordinated communication cell') can include one or more BSs. Among the BSs, a BS that has the highest priority in transmitting signals (such as control signals) to the terminal can be defined as a serving BS, and the others BSs having lower priorities than the serving BS are defined as cooperative BSs.

FIG. 1 illustrates an exemplary embodiment of a coordinated communication cell according to this disclosure.

Referring to FIG. 1, a coordinated communication cell system can include a terminal 100, a serving BS 105, a cooperative BS1 110 and a cooperative BS2 115. The terminal 100 can perform direct communication with the serving BS 105, the cooperative BS1 110 or the cooperative BS2 115, when necessary.

A BF system can have a property of strong straightness accuracy and can transmit signals lacking multiple multi-path components in an mmWave band. Due to this, the BF system can have no severe frequency selectivity and instead a relatively flat frequency characteristic in the mmWave band, unlike the existing cellular system channels. In other words, the BF system does not undergo significant change in channels and maintains a certain level of correlation among neighboring sub-carrier frequencies.

In the mmWave band, the BF system can suffer from unstable signal strengths depending on beamwidth while connecting to a BS, which leads to link instability. In addition, despite introduction of the coordinated communication cell to overcome the shortcomings, there can be frequent occurrences of connection loss, which makes it difficult to reliably support a terminal located in a cell coverage boundary.

According to an exemplary embodiment of this disclosure, a method is disclosed for implementing a more reliable channel for a terminal located in a cell coverage boundary by utilizing characteristics of the BF system in the mmWave band. As will be disclosed further herein, clouds cells can be configured to cancel interference and amplify transmits signals.

Figure 2:
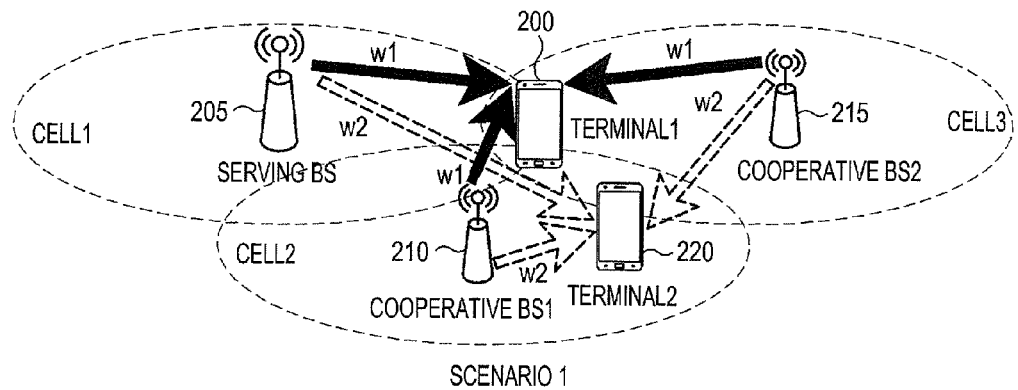
FIG. 2 illustrates an example embodiment of a cloud cell according to this disclosure.

FIG. 2 illustrates an exemplary embodiment of a cloud cell (scenario 1), according to this disclosure.

Referring to FIG. 2, the cloud cell system can include two different terminals, a first terminal (TERMINAL 1) 200 and a second terminal (TERMINAL 2) 220, a serving BS 205, a cooperative BS1 210 and a cooperative BS2 215.

The serving BS 205, cooperative BS1 210, and cooperative BS2 215 can serve the first terminal 200 and the second terminal 220 for each frame in any order. In an embodiment, the first terminal 200 and the second terminal 220 can be located around cell coverage boundaries. For example, the first terminal 200 can be located around cell 1's boundary and cell 3's boundary, while the second terminal 220 can be located around cell 2's boundary and the cell 3's boundary. When both the first terminal 200 and the second terminal 220 are located around cell coverage boundaries, the strength of received downlink (DL) signals can be weak at the terminals. Furthermore, transmit beams from BSs to the terminals can cause interference with each other.

Table 1 and Table 2 represent values of received signal strengths at the first terminal 200 and the second terminal 220, respectively.

TABLE 1 illustrates an exemplary embodiment of representative Received Signal Strength Values at the first terminal 200

| | BS | | | | | | | | |
|---|---|---|---|---|---|---|---|---|---|
| | Serving BS 205 | | | Cooperative BS1 210 Tx Beam ID | | | Cooperative BS #2 210 | | |
| | #1 | #2 | #3 | #1 | #2 | #3 | #1 | #2 | #3 |
| RX Signal Strength (dBm) | −90 | −92 | −85 (best path) | −86 (next best path) | −90 | −91 | −88 | −91 | −90 |

Assume in Table 1 and Table 2 that each of the serving BS 205, the cooperative BS1 210 and the cooperative BS2 215 use a total of three transmit beams, and each of the first terminal 200 and the second terminal 220 uses one receive beam. With this assumption, Table 1 represents strength values of signals received by the first terminal 200 on multiple paths that are made up of combination of three transmit beams of each BS and the receive beam of the first terminal 200. As shown in Table 1, the first terminal 200 can receive the strongest signal on a path with transmit beam ID #3 of the serving BS 205. Furthermore, the first terminal 200 can receive the next strongest signal on a path with transmit beam ID #1 of the cooperative BS1 210.

If the received signal strength on the path with transmit beam ID #3 of the serving BS 205 is less than a predetermined threshold, all other signals received on any paths made up of combinations of remaining BSs' transmit beams and the receive beam of the first terminal 200 have less strength than the predetermined threshold. In this case, Signal to Interference and Noise Ratio (SINR) that determines transmission quality of signals received by the first terminal 200 can be poor.

When the first terminal 200 is receiving a signal on the path with the transmit beam ID #3 of the serving BS 205, the cooperative BS1 210 can transmit a signal to the first terminal 200 on a path with its transmit beam ID #3 and the cooperative BS2 215 can transmit a signal to the first terminal 200 on a path with its transmit beam ID #2. The two transmit signals interfere with the signal being received by the first terminal 200. Due to the relative amount of interference from other cells compared to the current cell as well as noise, and the like, the SINR of the first terminal 200 can decrease further.

TABLE 2

Illustrates an exemplary embodiment of representative Received Signal Strength Values at the second terminal 220

| | BS | | | | | | | | |
|---|---|---|---|---|---|---|---|---|---|
| | Serving BS 205 | | | Cooperative BS1 210 TX Beam ID | | | Cooperative BS2 220 | | |
| | #1 | #2 | #3 | #1 | #2 | #3 | #1 | #2 | #3 |
| RX Signal Strength (dBm) | −89 | −88 | −85 (Next best Path) | −83 (Best Path) | −91 | −90 | −89 | −87 | −89 |

As shown in Table 2, the second terminal 220 can receive the strongest signal on a path with transmit beam ID #1 of the cooperative BS1 210. If the strength of the signal received on the path with transmit beam ID #1 of the cooperative BS 210 is less than the predetermined threshold, interference due to signal transmission from other BSs cannot be negligible.

Referring to Table 1 and Table 2, the best path of the first terminal 200 and the next best path of the second terminal 220 can be the same. Such a path can be formed between a transmitted beam of a BS and received beam of the terminal. If the serving BS 205 and cooperative BS1 210 supporting the paths transmit signals to the first terminal 200 and the second terminal 220 simultaneously the amount of mutual interference can increase even more.

In Table 1 and Table 2, it was assumed that each BS has three transmit beams and each terminal has one receive beam. However, in practice, combinations of more diversified transmit and receive beams can be used, although the same mechanisms as described above can also be applied thereto.

If at least two transmit beams that constitute favorite paths of the terminals correspond to each other, signals transmitted from the serving BS 105, the cooperative BS1 210, and the cooperative BS2 215 to the first terminal 200 and the second terminal 220 interfere with each other, thus hindering efficient and reliable wireless communications.

Figure 3:
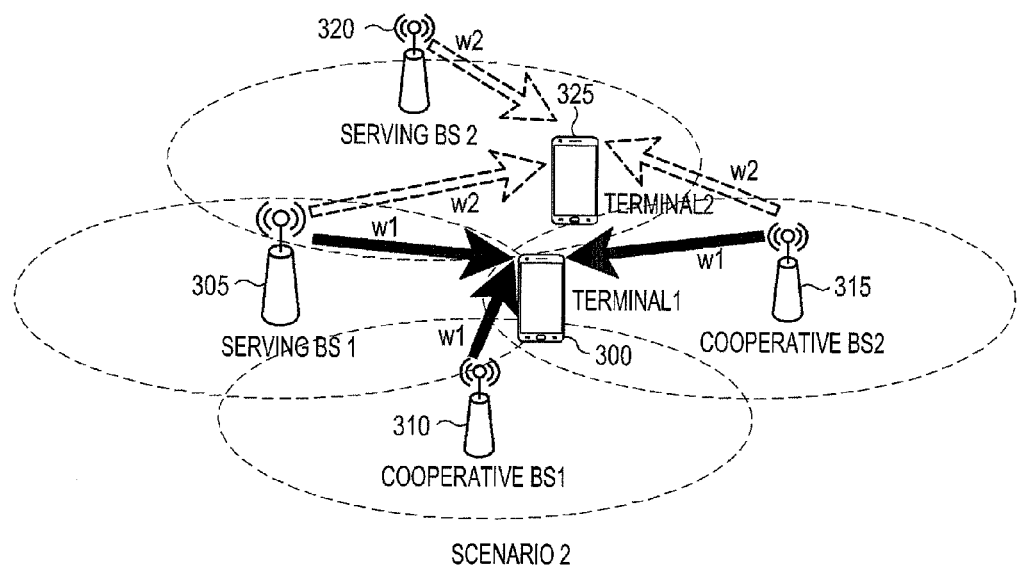
FIG. 3 illustrates an example embodiment of cloud cells according to this disclosure.

FIG. 3 illustrates an exemplary embodiment of a cloud cell system (scenario 2) according to the principles of this disclosure.

Referring to FIG. 3, for example, two cloud cells can co-exist, each cloud cell having a different serving BS. Specifically, BS1 305 and BS2 320 serve as serving BSs for terminals located within their own cloud cells. Also in this case, assume that at least two of transmit beams of the serving BS1 305, serving BS2 320, cooperative BS1 310 and cooperative BS2 315 that constitute paths with receive beams of the first terminal (TERMINAL 1) 300 and second terminal (TERMINAL 2) 325 correspond to each other. In this embodiment, signals transmitted from the serving BS1 305, serving BS2 320, cooperative BS1 310 and cooperative BS2 315 to the first terminal 300 and second terminal 325 interfere with each other, thus hindering efficient and reliable wireless communications. In this embodiment, the signal interference of scenario 2 can occur similarly to scenario 1 as illustrated in the embodiment of FIG. 2, due to transmit beams for the first terminal 300 and second terminal 325, which correspond to each other, so the detailed description of which will be omitted herein.

It should be understood that for a terminal expecting to suffer from high interference such as scenarios 1 or 2 as illustrated in the exemplary embodiments of FIGS. 2 and 3, a method for using a lower Modulation and Coding Scheme (MCS) level, especially bit-level repetition codes to increase reliability of the receive signal has been used. Despite this, interference from signal has been hardly removed and thus the effect of increasing reliability is limited.

In the exemplary embodiments according to the principles of this disclosure, as shown in FIGS. 2 and 3, BSs receive "favorite beam configuration information" from terminals. In an embodiment, the favorite beam configuration information can include combinations of transmit and receive beams that are mapped to a signal received from any of the serving BSs and cooperative BSs whose signal strength is no less than a predetermined signal strength threshold. The favorite beam configuration information can include a combination of one transmit beam of the corresponding BS and one receive beam of the terminal or of a predetermined number of combinations of transmit and receive beams, for example in order of priority. A detailed description of the favorite beam configuration information is described herein. Based on the favorite beam configuration information, it can be determined whether a terminal (such as an "interference-expected cell boundary terminal") is expected to suffer from low received signal strength and degraded communication performance, for example due to inter-cell interference. Among the interference-expected cell boundary terminals, terminals at least one of whose favorite transmit beams correspond to each other are grouped. Embodiments of the present disclosure provide a method for efficiently canceling interference by sequentially performing Walsh coordinated scheduling, symbol repetition, Walsh encoding, and the like, on the interference-expected cell boundary terminals.

In the embodiments, MCS levels in a reduced form (hereinafter, referred to as 'reduced MCS levels') which are different from basic MCS levels applicable to communication systems, are redefined based on Walsh length information defined by the symbol repetition and Walsh encoding. The reduced MCS levels can support various coding rates while lowering possible overheads.

In accordance with embodiments of this disclosure, terminals and BSs determine whether to perform Walsh coordinated scheduling. The determination can be made depending on one of two conditions, which will be described below.

Figure 4A:
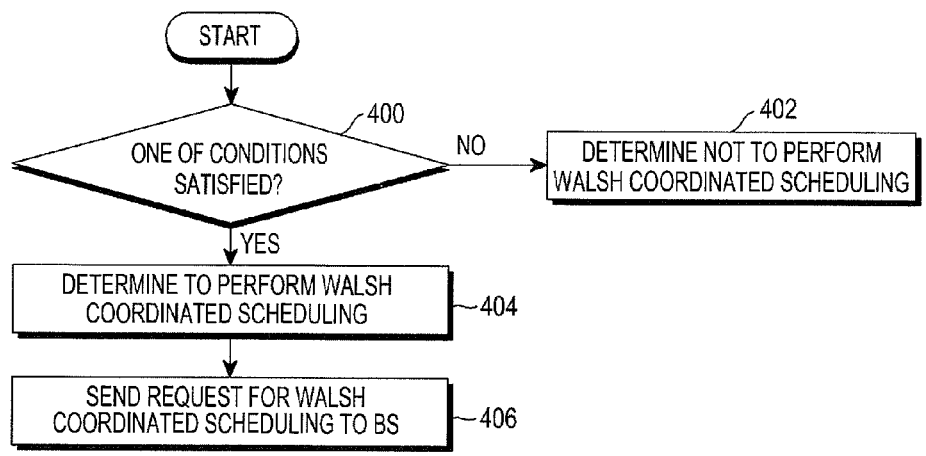
FIG. 4A is flowchart illustrating an example embodiment of operations of a terminal determining whether to perform 'Walsh coordinated scheduling', according to this disclosure.

FIG. 4A is flowchart of an exemplary embodiment according the principles of this disclosure illustrating operations of a terminal determining whether to perform 'Walsh coordinated scheduling', according to this disclosure.

Referring to FIG. 4A, in operation 400, it is determined whether a terminal satisfies at least one of conditions represented by Equations 1, 2, or 3. If the terminal does not satisfy any of the conditions of Equations 1, 2, or 3, in operation 402, the terminal can determine not to perform the 'Walsh coordinated scheduling'.

Otherwise, if the terminal satisfies at least one of the conditions of Equations 1, 2, or 3, in operation 404, the terminal can determine to perform the 'Walsh coordinated scheduling'. In operation 406, the terminal sends a serving BS and cooperative BSs through the serving BS a request for 'Walsh coordinated scheduling'.

$$SINR_{best} < SINR_{Th} \quad \text{Equation 1}$$

where $SINR_{best}$ represents SINR of a signal received on a reception path between a transmit beam of a BS, which was measured and determined to be the best at the terminal, and a receive beam of the terminal. $SINR_{Th}$ represents an SINR threshold for terminals to start 'Walsh coordinated scheduling', which is sent to the terminals in a system configuration stage or sent from a BS on a broadcast channel. If even SINR of a best path is less than the $SINR_{Th}$ in Equation 1, in operation 404, the terminal can determine to perform the Walsh coordinated scheduling.

$$P_{Rx_{best}} < P_{Th} \quad \text{Equation 2}$$

where $P_{Rx\_best}$ represents the received signal strength of a signal received by the terminal on a path between a best transmit beam of a BS measured by the terminal and a receive beam of the terminal. $P_{Th}$ represents a received signal strength threshold for terminals to start 'Walsh coordinated scheduling', which is sent to the terminals in a system configuration stage or sent from a BS in advance on a broadcast channel.

If even a received signal strength of a best path is less than the $P_{Th}$ in Equation 2, in operation 404, the terminal can determine to perform Walsh coordinated scheduling.

$$P_{member\_INTF} > P_{non\_member} + P_{noise} + \delta 1 \quad \text{Equation 3}$$

where $P_{member\_INTF}$ represents an average of the sum of signal strengths of interference signals except data signals received by the terminal from BSs that constitute a coordinated communication cell to which the terminal belongs. As a specific example, $P_{member\_INTF}$ can be estimated by taking an average of received signal strengths from the serving BS and cooperative BSs that constitute the cell on a reference channel. It will be understood that there can be other various ways of measuring the $P_{member\_INTF}$, the description of which will be omitted herein. $P_{non\_member}$ represents a value of interference received from other BSs that do not constitute the coordinated communication cell to which the terminal belongs, among interference values measured at the terminal. $P_{noise}$ represents a signal strength of noise received at the terminal, and $\delta 1$ represents a interference threshold for the terminal to start 'Walsh coordinated scheduling', which is sent to the terminal in a system configuration stage or sent from a BS in advance on a broadcast channel. For example, the $P_{non\_member}$ can be calculated by Equation 4.

$$P_{non\_member} = P_{total} - P_{member\_INTF} \quad \text{Equation 4}$$

where $P_{Total}$ represents an average of the total amount of interference measured at the terminal. The $P_{total}$ can be estimated by measuring a total signal strength in a non-transmission area of the data signal that is transmitted to the terminal and taking average of the total signal strengths in non-transmission areas. Specifically, with Equation 4, the terminal can estimate a total amount of interference received from other BSs that do not constituting the coordinated communication cell to which the terminal belongs, by excluding an amount of interference from the BSs constituting the cell from the total interference strength.

With Equation 3, if the amount of interference received from BSs constituting the coordinated communication cell to which the terminal belongs is greater than other interference, noise strength, and δ1 provided beforehand, such as if the amount of interference exceeds the sum of amounts of interference coming from BSs constituting the coordinated communication cell, in operation 400, the terminal can determine to perform the 'Walsh coordinated scheduling'.

Equation 1 and Equation 2 represent that quality of data signals received at the terminal is not good enough.

Equation 3 can be further explained through the following Equation 5.

$$SINR_{best} = P_{RX\_best}/(P_{member\_INF} + P_{non\_member} + P_{noise}) \quad \text{Equation 5}$$

That is, $SINR_{best}$ for a path having the best signal quality for the terminal is calculated by diving the best received signal strength, which is $P_{RX\_best}$ by the sum of the amount of interference received from BSs constituting the coordinated communication cell to which the terminal belongs, amounts of interference received from the other BSs and the amount of noise power.

In embodiments of the present disclosure, by canceling the interference by means of orthogonal Walsh codes properties for transmit signals of other BSs that are simultaneously allocated to the interference-expected cell boundary terminals, instead of decreasing the transfer rate through symbol repetition and Walsh encoding for the interference-expected cell boundary terminals, signal transfer reliability can be increases. The canceled interference can correspond to signals transmitted by BSs that are members of the coordinated communication cell to which the terminal belongs. It means that $P_{member\_INTF}$ can become an ideal value, such as '0'. However, if $P_{member\_INTF}$ does not have a great value compared with other interference, which is the sum of Pnon_member and $P_{noise}$, making $P_{member\_INTF}$ be '0' cannot bring a sufficient capacity gain effect of Walsh coordinated scheduling.

In embodiments of the present disclosure, to obtain the capacity gain of 'Walsh coordinated scheduling', the amount of interference of member BSs that constitute the coordinated communication cell to which the terminal belongs is assumed to be relatively large. Accordingly, Equation 3 is used to compare the interference signal strength from BSs constituting the coordinated communication cell of the terminal with the other interference strength, and if the former is greater, the terminal can perform the Walsh coordinated scheduling.

Figure 4B:
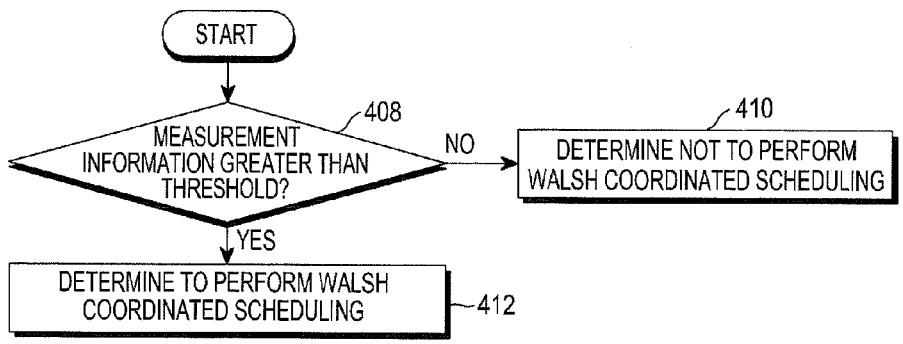
FIG. 4B is flowchart illustrating an example embodiment of operations of a base station (BS) determining whether to perform 'Walsh coordinated scheduling', according to this disclosure.

FIG. 4B is flowchart illustrating operations of a serving BS determining whether to perform 'Walsh coordinated scheduling', according to an embodiment of the present disclosure.

Referring to FIG. 4B, in operation 400, the serving BS can compare measurement information received from the terminal with a predetermined threshold. The measurement information can include SINR or a received signal strength of the received signal at the terminal. Assume herein that the measurement information is SINR of the received signal at the terminal. In this case, the threshold can be $SINR_{Th}$ as represented in Equation 1.

If the measurement information exceeds the threshold, in operation 410, the serving BS can determine not to perform Walsh coordinated scheduling and can communicate with the terminal as it has done.

Otherwise, if the measurement information is less than the threshold, in operation 412, the serving BS can determine to perform Walsh coordinated scheduling for the terminal.

After that, if the terminal or the BS determines to perform 'Walsh coordinated scheduling', the terminal and the BS can perform the procedure of 'Walsh coordinated scheduling' in accordance with embodiments of the present disclosure in connection with FIGS. 4 to 7.

Figure 4C:
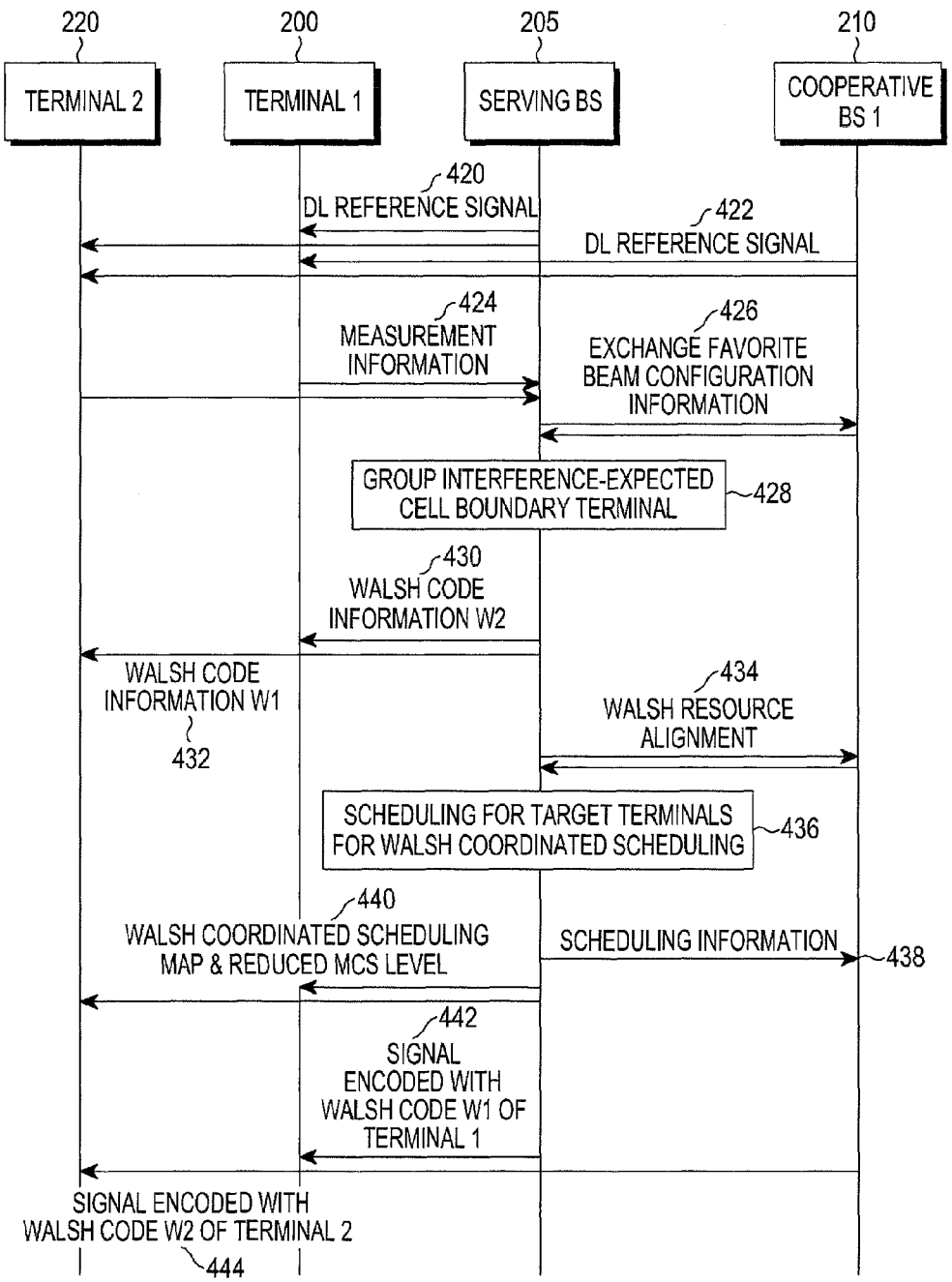
FIG. 4C is flowchart illustrating an example embodiment of operations of allocating Walsh coordinated resources to one or more interference-expected cell boundary terminals according to this disclosure.

FIG. 4C is flowchart illustrating an exemplary embodiment of operations of Walsh coordinated scheduling for one or more interference-expected cell boundary terminals in a situation of scenario 1 as shown in FIG. 2, according to an embodiment of the present disclosure. For convenience of explanation, the coordinated communication cell is assumed to be what is shown in FIG. 2.

Referring to FIG. 4C, in operation 420, the serving BS 205 can transmit a DL reference signal to each of terminals within the coordinated communication cell to which the serving BS 205 belongs, such as the first terminal 200 and second terminal 220. Likewise, in operation 422, the cooperative BS1 210 can also transmit the DL reference signal to each of the first terminal 200 and second terminal 220. Although the cooperative BS2 215 is not shown herein for convenience of explanation, there can be many cooperative BSs within the coordinated communication cell, each of the cooperative BSs doing the same operations.

In operation 424, the first terminal 200 and second terminal 220 can create respective measurement information and transmit them to the serving BS 205. The measurement information can also be a respective favorite beam configuration information of the terminal, which is based on SINR or received signal strength of a received signal at the terminal. The first terminal 200 and second terminal 220 can each determine a set of BSs, such as the serving BS 205 and cooperative BS1 210 that sent the DL reference signal, to be a set of BSs that constitute a coordinated communication cell and that can communicate with the terminal (hereinafter, referred to as 'member set'), and store the member set in its coordinated communication cell constituent BSs list.

In accordance with an embodiment of the present disclosure, a BS can use information regarding two or more paths through which signals whose signal strengths are equal to or greater than a predetermined threshold arrive at each terminal, to perform 'Walsh coordinated scheduling'. With the information, the first terminal 200 and second terminal 220 can each measure a received signal strength of the DL reference signal received through paths with BSs constituting the coordinated communication cell of the terminal. The first terminal 200 and second terminal 220 can select paths through which signals whose received signal strengths are equal to or greater than the threshold arrive at the terminals. The first terminal 200 and second terminal 220 can then configure a predetermined number of combinations of transmit and receive beams, a pair of which constitutes a path, as their favorite beam configuration information, and report the favorite beam configuration information to the serving BS 205. The predetermined number of combinations of transmit and receive beams constitute the predetermined number of paths determined in order of received signal strengths. The predetermined number of combinations can be notified from the serving BS 205 on a broadcast channel. Alternatively, the favorite beam configuration information can be configured in advance on a system basis, or based on a threshold value transmitted in advance by a BS on a broadcast channel. For example, the terminal can configure its favorite beam configuration information with Equation 6 using received signal strengths on its paths and the threshold.

$$\arg(v,w)[P_{Rx}(V,W) > P_{Th}] \quad \text{Equation 6}$$

where v represents a receive beam index of the terminal and w represents a transmit beam index of the BS. PRx(v,w) represents a received signal strength measured by the terminal on a signal arriving at the terminal via a path with receive beam v of the terminal and transmit beam w of the BS, and $P_{Th}$ represents a received signal strength threshold, which is determined on the system basis or notified in advance from a BS on a broadcast channel.

The terminal can configure its favorite beam configuration information with combinations of transmit and receive beams constituting paths that satisfy Equation 6.

In another embodiment, the threshold determined on a system basis or notified in advance from a BS on a broadcast channel can be defined as a threshold for ratios of a received signal strength on a best path to received signal strengths on other paths or differences between a received signal strength on a best path and received signal strengths on the other paths, and the terminal's favorite beam configuration information can be configured using Equation 7.

$$\arg(v,w)[P_{best} - P_{Rx}(V,W) < R_{th}] \text{ or } \arg(v,w)[P_{best}/P_{Rx}(v,w) < R_{Th}] \quad \text{Equation 7}$$

where $P_{best}$ represents a received signal strength on a best path among all paths of the terminal, through which signals having the best strength arrive at the terminal, $P_{Rx(v,w)}$ represents a received signal strength on any other path than the best path, such as a received signal strength on a path with transmit beam w and receive beam v, and $R_{Th}$ represents a ratio of the received signal strength of the best path to the received signal strength of any other path or a difference between them.

Accordingly, the terminal can use Equation 7 to measure the received signal strength of the best path, the received signal strengths of other paths than the best path, and the ratios or differences between them, and configure its favorite beam configuration information with combination of transmit and receive beams that constitute some paths that satisfy Equation 7. It is noted that one or more thresholds can be applied to configure the favorite beam configuration information.

Table 3 represents a specific example of the favorite beam configuration information configured by the terminal in accordance with an embodiment of the present disclosure.

TABLE 3

| BS (Cell/Sector) ID | TX beam ID | Terminal RX Beam ID | Received Signal Strength or Quality (SINR etc.) |
|---|---|---|---|
| BS1 | #1 | #1 | P1 |
| BS1 | #2 | #1 | P2 |
| BS2 | #5 | #1 | P3 |
| BS3 | #10 | #2 | P4 |
| BS1 | #3 | #2 | P5 |
| BS3 | #11 | #1 | P6 |
| BS1 | #4 | #2 | P7 |
| BS1 | #5 | #2 | P8 |
| BS3 | #12 | #1 | P9 |

Referring to Table 3, the terminal's favorite beam configuration information can include, for example, a BS (cell/sector) ID, the BS's transmit beam ID and a receive beam ID of a terminal mapped to the BS's transmit beam ID, a received signal strength or quality information of a last signal received by the terminal through a path with the transmit and receive beam IDs. The BS ID can further include a cell coverage ID of the BS or a sector ID for a sector obtained by dividing the cell coverage. BS IDs are identifiers of member BSs listed in the terminal's coordinated communication cell member BSs list, and can be replaced with a reduced type of indices recognizable to the terminal. In Table 3, since the terminal's receive beam ID is information for identifying the BS's transmit beam that constitutes a path with the terminal's receive beam, it can have a simpler form unlike what is shown in Table 3 and, optionally, be transmitted as a group index. The received signal strength or quality information can also be omitted or replaced with a reduced form to lower feedback overheads of the terminal.

Paths having the transmit and receive beams included in the favorite beam configuration information can provide the terminal with signals whose received signal strengths are higher than the aforementioned thresholds. However, as discussed earlier, if there is another signal transmitted to any other terminal through the same path together with the signal transmitted to the corresponding terminal, interference can occur.

To address this, in operation 426, the serving BS 205 that received a report of the favorite beam configuration information can exchange favorite beam configuration information with a BS within the coordinated communication cell to which the serving BS 205 belongs, e.g., the cooperative BS1 210. Specifically, the serving BS 205 can forward the respective favorite beam configuration information of the first terminal 200 and second terminal 220 received in operation 424 to the cooperative BS1 210. The serving BS 205 can then receive from the cooperative BS1 210 respective favorite beam configuration information of the first terminal 200 and second terminal 220 that was received by the cooperative BS1 210 from the terminals. While it is described herein that the serving BS 205 obtains the favorite beam configuration information that was received by the cooperative BS1 210, the serving BS 205 can obtain such favorite beam configuration information from any other cooperative BS in the same manner as described above, if there can be multiple cooperative BSs included in the coordinated communication cell. In operation 428, the serving BS 205 can determine whether to group terminals based on received signal strengths included in the favorite beam configuration information of interference-expected cell boundary terminals that belong to each of BSs, the favorite beam configuration information being obtained from any of cooperative BSs within the coordinated communication cell of the serving BS 205, and based on the determination, the serving BS 205 can group terminals selected from among the interference-expected cell boundary terminals (hereinafter, referred to as 'target terminals for Walsh coordinated scheduling'). For example, the serving BS 205 can determine to group the terminals that satisfy a condition where there are more than a predetermined number of received signal strengths included in a respective terminal's 'favorite beam configuration information' received by the serving BS 205 from the terminal or a cooperative BS, which are less than a received signal strength threshold. Alternatively, the serving BS 205 can determine to group the terminals that satisfy a condition where a maximum received signal strength of received signal strengths included in a respective terminal's 'favorite beam configuration information' is less than the received signal strength threshold. For example, assume that the first terminal 200 and second terminal 220 satisfy one of the aforementioned conditions and thus are grouped as target terminals for Walsh coordinated scheduling. Then, in an embodiment of the present disclosure, similarity between the target terminals for Walsh coordinated scheduling can be determined based on their respective favorite beam configuration information. Specifically, if there are two or more transmit beams of a same BS mapped to a same receive beam in the respective favorite beam configuration information of the first terminal 200 and second terminal 220 (hereinafter, referred to as 'common transmit beams'), the common transmit beams are selected and paths with the common transmit beams are allocated orthogonal Walsh codes, thereby making the mutual interference be '0'.

More specifically, Table 4 represents an example of results of determining the similarity based on the respective favorite beam configuration information received from the first terminal 200 and second terminal 220, which is performed by the serving BS 205.

TABLE 4

| Terminal 1 | | Terminal 2 | |
|---|---|---|---|
| BS ID/TX Beam ID (Index) | Terminal RX Beam ID | BS ID/TX Beam ID | Terminal RX Beam ID |
| BS1/#1 | #1 | BS1/#5 | #1 |
| BS2/#1 . . . (A1) | | BS2/#5 | |
| BS3/#1 . . . (B) | | BS3/#1 | #2 |
| BS1/#2 | #2 | BS2/#1 | |
| BS2/#1 . . . (A2) | | BS3/#5 | |
| BS3/#4 | | BS3/#6 | #3 |

Referring to Table 4, for convenience of explanation, pieces of information obtained from respective favorite beam configuration information received from the first terminal 200 and second terminal 220 are classified by respective terminals' receive beams. For example, in Table 4, assume that the first terminal 200 has two receive beams and the second terminal 220 has three receive beams, and BS1 and BS2 are IDs of the serving BS 205 and cooperative BS1 210, as shown in FIG. 4, respectively, and BS3 is an ID of a cooperative BS 2. Although not shown in FIG. 4, it is also assumed that the cooperative BS2 is a member BS included in the member BSs set. Referring to Table 4, respective favorite beam configuration information of the first terminal 200 and second terminal 220 has transmit beam ID #1 of BS2 and transmit beam ID #1 of BS3 in common. Thus, the transmit beam ID #1 of BS2 and transmit beam ID #1 of BS3 mapped to receive beam ID #1 of the first terminal 200, and transmit beam ID #1 of BS2 and transmit beam ID #1 of BS3 mapped to receive beam #2 of the second terminal 220 are all selected as the common transmit beams.

However, in Table 4, in case of the transmit beam ID #1 of BS2 mapped to the receive ID #2 of the first terminal 200, there is no other BS mapped to the transmit beam ID #1. Accordingly, even if the transmit beam ID #1 of BS2 is mapped to the receive beam ID #2 of the second terminal 220, the transmit beam ID #1 of BS2 mapped to the receive beam #2 of the first terminal 200 and the transmit beam ID #1 of BS2 mapped to the receive beam ID #2 of second terminal 220 cannot be selected as the common transmit beams since they do not satisfy the above condition. While it is assumed herein that there are two terminals having common transmit beams within a coordinated communication cell, the number of such terminals can vary in other embodiments.

As described above, after completion of grouping target terminals for Walsh coordinated scheduling, the serving BS 205 can allocate unique Walsh codes for each terminal included in the same group, such as the first terminal 200 and second terminal 220. The Walsh code to be allocated to each of the first terminal 200 and second terminal 220 included in the same group can be selected from a predetermined total Walsh codes range for the terminals to receive interference-free signals for resources allocated to the terminals simultaneously. After completion of grouping of terminals and allocation/selection of unique Walsh codes for terminals in the same group, the serving BS 205 can perform Walsh resource alignment for Walsh coordinated scheduling for the terminals by forwarding information regarding Walsh codes allocated to terminals in each group to the cooperative BS1 210. That is, in operation 430, the serving BS 250 can forward information about Walsh code w1 allocated to the first terminal 200 to the first terminal 200 and in operation 432, the serving BS 250 can forward information about Walsh code w2 allocated to the second terminal 220 to the second terminal 220.

In operation 434, the serving BS 205 can perform the Walsh resource alignment by having cooperative BSs including the cooperative BS1 210 forward information regarding Walsh codes allocated to terminals in each group.

The information regarding Walsh codes can include an index and length information of the Walsh code. Walsh codes are information to be used by the terminal in decoding signals received from a BS, indicating symbol repetition on a frequency axis based on the length information. While not shown in FIG. 4, if there are many cooperative BSs within the coordinated communication cell of the serving BS 205, the serving BS 205 can perform the Walsh resource alignment by having each of the cooperative BSs, including the cooperative BS1 210, forward the information regarding Walsh codes allocated to terminals in each group to the terminals. Alternatively, the serving BS 205 can perform the Walsh resource alignment by forwarding the information regarding Walsh codes allocated to terminals in each group to each neighboring BSs.

In operation 436, the serving BS 205 can schedule for the target terminals for Walsh coordinated scheduling. Specifically, the serving BS 205 can determine which BS is to serve each of the first terminal 200 and second terminal 220, and allocate Walsh coordinated resources on the same location to the target terminals for Walsh coordinated scheduling. More specifically, assume that the serving BS 205 determines to serve the second terminal 220 through the cooperative BS1 210. In operation 438, the serving BS 205 can transmit scheduling information for the second terminal 220 to the cooperative BS1 210. The scheduling information can include information regarding the allocated Walsh coordinated resources on the same location and reduced MCS level information in accordance with an embodiment of the present disclosure.

In operation 440, the serving BS 205 can transmit Walsh scheduling information that includes Walsh scheduling MAP that notifies allocation of Walsh coordinated resources on the same location and the reduced MCS level to the respective first terminal 200 and second terminal 220.

In operation 442, the serving BS 205 can encode the Walsh coordinated resources on the same location with the Walsh code w1 of the first terminal 200, and transmit the encoded signal to the first terminal 200. Similarly, in operation 444, the cooperative BS1 210 can encode the Walsh coordinated resources on the same location with the Walsh code w2 of the second terminal 220, and transmit the encoded signal to the second terminal 220.

Figure 5:
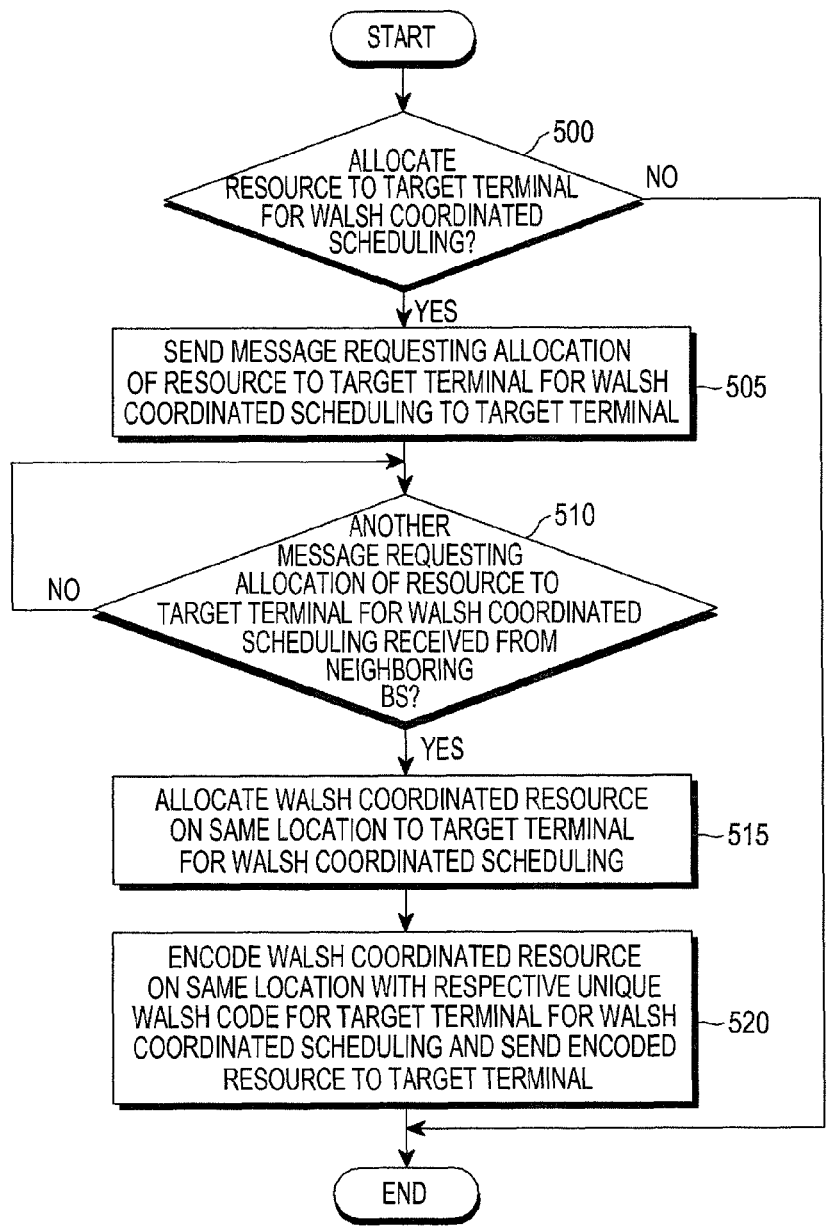
FIG. 5 is flowchart illustrating an example embodiment of operations of a serving BS allocating Walsh coordinated resources at the same location to target terminals for Walsh coordinated scheduling according to this disclosure.

FIG. 5 is a flowchart illustrating an exemplary embodiment of operations of a serving BS allocating Walsh coordinated resources on the same location to target terminals for Walsh coordinated scheduling, according to scenario 1 of this disclosure. Assume that similarity of favorite beam configuration information of terminals can be determined and target terminals for Walsh coordinated scheduling are grouped as described in connection with operation 428 of FIG. 4, and that unique Walsh codes can be allocated to terminals in the same group.

Referring to FIG. 5, in operation 500, the serving BS can determine to allocate coordinated (transmission) resources to at least one of the target terminals for Walsh coordinated scheduling.

In operation 505, the serving BS can send a message requesting allocation of coordinated transmission resources to the at least one target terminal for Walsh coordinated scheduling to a cooperative BS within a coordinated communication cell to which the at least one target terminal for Walsh coordinated scheduling belongs.

In operation 510, the serving BS can check if a message to request another target terminal for Walsh coordinated scheduling has been received from a neighboring BS. The neighboring BS can be one of cooperative BSs that constitute the coordinated communication cell to which the target terminal for Walsh coordinated scheduling belongs. If the message to request another target terminal for Walsh coordinated communication has not been received, the serving BS can wait for another request message Otherwise, if the message to request another target terminal for Walsh coordinated communication has been received, in operation 515, the serving BS can allocate Walsh coordinated resources on the same location, which can be simultaneously allocated by the neighboring BS that sent the message, to target terminals for Walsh coordinated scheduling. In operation 520, the serving BS can encode the Walsh coordinated resources with unique Walsh codes for the target terminals for Walsh coordinated scheduling, and forward the encoded signal to the target terminals for Walsh coordinated scheduling.

While not shown in FIG. 5, the serving BS that allocates the Walsh coordinated resources on the same location to the target terminals for Walsh coordinated scheduling can notify the terminals that the Walsh coordinated resources are allocated and send a location of the allocated Walsh coordinated resources on the same location and the reduced MCS level by sending a Walsh scheduling MAP to the target terminals for Walsh coordinated scheduling.

Since the target terminals for Walsh coordinated scheduling are located around cell coverage boundaries, an MCS level corresponding to relatively high code rate is likely to be used. Accordingly, compared with conventional MCS level set, the reduced MCS level can have coding rates including Walsh code length-based repetition and coding rates excluding those equal to or higher than a certain reference value from the conventional MCS level set.

FIG. 6 show exemplary embodiments representing a reduced MCS level set and ordinary MCS level set, according to this disclosure.

Table 1 in FIG. 6, represents a comparison of an ordinary MCS level set with a reduced MCS level set.

Referring to table 1 of FIG. 6, an existing MCS level set is taken as an example of a basic MCS level set to be used in a communication system. The existing MCS level set can have a total of 16 code rates based on 16 MCS formats, represented by four bits.

In comparison, a reduced MCS level set includes a total of 8 code rates, represented by three bits. Since the reduced MCS level set is represented with 1 less bits than the existing MCS level, thus reducing unnecessary overheads. Each of 8 MCS levels is configured to apply a different code rate depending on the length of a Walsh code allocated to the existing terminal. As a result, the reduced MCS level set can support various coding rates. Specifically, referring to table 2 of FIG. 6, code rates are mapped depending on lengths of Walsh codes, e.g., length 2, length 4, length 8 and length 16. The serving BS can perform symbol-level repetition on the frequency axis (which can be extended to the time axis) on an area of the Walsh coordinated resources allocated to the target terminal for Walsh coordinated scheduling as often as a designated MCS level in a reduced form and the length of an already allocated unique Walsh code. The repeated area of the Walsh coordinated resources can be encoded with Walsh codes of the terminal and the encoded result can be sent to the terminal.

Assume that not only the serving BS but also any cooperative BS included in the member set receives the Walsh resource allocation MAP and the reduced MCS level. In this case, the cooperative BS can perform receive combining on signals repeated based on the length of the already known unique Walsh code of the terminal and then decode the signals. By doing this, the cooperative BS can cancel interference and also receive its amplified signal.

Figure 7:
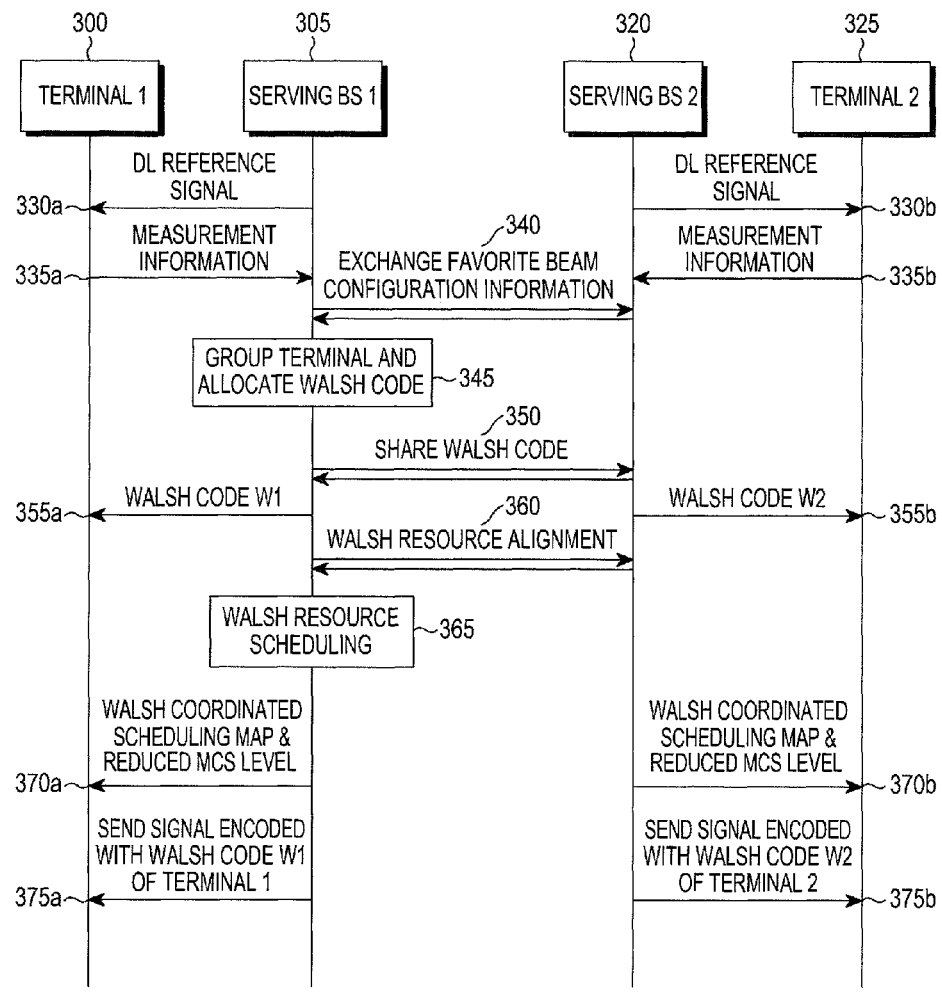
FIG. 7 is flowchart illustrating an example embodiment of operations of allocating coordinated transmission resources to target terminals for Walsh coordinated scheduling according to this disclosure.

FIG. 7 is a flowchart illustrating an exemplary embodiment of operations allocating coordinated transmission resources to target terminals for Walsh coordinated scheduling at least similar to scenario 2, according to this disclosure. For convenience of explanation, the coordinated communication cell is assumed to be what is shown in FIG. 3.

Referring to FIG. 7, in operation 330a, the serving BS 305 can send a DL reference signal to the first terminal 300 located within its coordinated communication cell. Likewise, in operation 330b, the serving BS 305 can send the DL reference signal to the second terminal 325 located in the coordinated communication cell. Although not shown in FIG. 7, the first terminal 300 and second terminal 325 can receive the DL reference signal even from any other cooperative BS within the coordinated communication cell.

In operation 335a and 335b, the first terminal 300 and second terminal 325 can create their respective measurement information and send the measurement information to the serving BS1 305 and serving BS2 320, respectively. The measurement information can also include favorite beam configuration information of the respective terminal, which is based on SINR or received signal strength of a received signal at the terminal. The way to create the favorite beam configuration information was described in connection with operation 424 of FIG. 4, so the description of which will be omitted herein.

Paths having transmit and receive beams included in the favorite beam configuration information can indicate the terminal of signals whose received signal strengths are higher than the aforementioned thresholds. However, as discussed earlier, if there is another signal transmitted to any other terminal through the same path together with the signal transmitted to the corresponding terminal, interference can occur.

To avoid this, in operation 340, the serving BS1 305 and serving BS2 320, both of which received respective reports of favorite beam configuration information, can exchange their respective reported favorite beam configuration information. Specifically, the serving BS1 305 can send its favorite beam configuration information to the serving BS2 320. The serving BS2 320 can also obtain the favorite beam configuration information of the second terminal 325 from the serving BS1 305.

In operation 345, the serving BS1 305 can determine whether to group terminals based on received signal strengths included in the favorite beam configuration information of interference-expected cell boundary terminals that belong to each of BSs, the favorite beam configuration information being obtained from any of cooperative BSs within the coordinated communication cell of the serving BS1 305 or from a neighboring serving BS, such as the serving BS2 320. For example, assume that the serving BS1 305 determines whether a condition is satisfied where favorite beam configuration information of each terminal (which can be received from the neighboring serving BS) contains more than a predetermined number of signals whose received signals strengths are less than a threshold. The serving BS1 305 can determine to group the terminals whose favorite beam configuration information contains more than a predetermined number of signals whose received signals strengths are less than a threshold from among the interference-expected cell boundary terminals. Alternatively, the serving BS 205 can determine to group the terminals that satisfy a condition where a maximum received signal strength of received signal strengths included in a respective terminal's 'favorite beam configuration information' is less than the received signal strength threshold. For example, assume that the first terminal 300 and second terminal 320 satisfy one of the aforementioned conditions and thus are grouped as target terminals for Walsh coordinated scheduling. Then, in an embodiment of the present disclosure, similarity between the target terminals for Walsh coordinated scheduling can be determined based on their respective favorite beam configuration information. Specifically, if there are two or more transmit beams of a same BS mapped to a same receive beam in the respective favorite beam configuration information of the first terminal 300 and second terminal 320 (hereinafter, referred to as 'common transmit beams'), the common transmit beams are selected and paths with the common transmit beams are allocated orthogonal Walsh codes, thereby making the mutual interference be '0'. After the grouping is complete, the serving BS 305 can allocate a unique Walsh code to each terminal included in the same group. The Walsh code to be allocated to each of the terminals in the same group can be selected from a predetermined total Walsh codes range for the terminals to receive interference-free signals for resources allocated to the terminals simultaneously. After completion of grouping of terminals and allocation/selection of unique Walsh codes for each terminal, in operation 350, the serving BS1 305 can share the Walsh codes by forwarding information regarding the Walsh codes allocated to terminals in each group to the cooperative BS2 320. Although not shown in FIG. 7, the serving BS1 305 can also send the information regarding the Walsh codes allocated to terminals in the same group to the cooperative BSs within the coordinated communication cell to which the serving BS1 305 belongs.

Similarly, although not shown in FIG. 7, the serving BS2 320 can also send the information regarding Walsh codes allocated to terminals in each group to each of the remaining cooperative BSs, if there are multiple cooperative BSs within the coordinated communication cell to which the serving BS2 320 belongs. For example, assume that the first terminal 300 and second terminal 325 are grouped in the same group. Then, in operation 355a, the serving BS1 305 can allocate one of Walsh codes which has not yet been allocated to terminals included in the same group to the second terminal 325. The serving BS1 305 can send the first terminal 300 information regarding Walsh code w1 that is allocated to the first terminal 300. The information regarding Walsh code can include index and length information of the Walsh code. Walsh codes are information to be used by the terminal in decoding signals received from a BS, indicating symbol repetition on a frequency axis based on the length information.

In operation 355b, the serving BS2 320 can allocate one of Walsh codes, w2, which has not yet been allocated to terminals in the same group, to the second terminal 325 by means of the information regarding Walsh codes obtained in operation 350. The serving BS2 320 can then send the second terminal 325 information regarding the Walsh code w2 that is allocated to the second terminal 325. The information regarding the Walsh code w2 can also include index and length information of the Walsh code.

After this, if allocation of transmission resources for the grouped terminals to which allocation of Walsh codes have been complete are requested, in operation 360, the serving BS1 305 can perform Walsh resource alignment. For example, assume that Walsh coordinated scheduling for the first terminal 300 is requested while Walsh coordinated scheduling for the second terminal 325 with the serving BS2 320 is requested. In this case, in operation 360, the serving BS1 305 can send a message requesting Walsh coordinated scheduling for the first terminal 300 to the cooperative BS2 320. The cooperative BS1 305 can receive a message requesting Walsh coordinated scheduling for the second terminal 325 from the serving BS2 320 and perform Walsh resource alignment.

In operation 365, the serving BS1 305 can perform Walsh resource scheduling. Specifically, the serving BS1 305 can allocate Walsh coordinated resources on the same location for the first terminal 300 and second terminal 325. In operation 370a, the serving BS1 305 can send Walsh scheduling information that includes Walsh resource allocation MAP that notifies allocation of Walsh coordinated resources on the same location and the reduced MCS level to the first terminal 200. In operation 370b, the serving BS2 320 can also send Walsh scheduling information that includes Walsh resource allocation MAP indicating information regarding Walsh coordinated resources on the same location and the reduced MCS level to the second terminal 325. The Walsh resource allocation MAP can include location of the Walsh coordinated resources on the same location, notifying allocation of the Walsh coordinated resources on the same location.

In operation 375a, the serving BS1 305 can encode the Walsh coordinated resources on the same location with the Walsh code w1 of the first terminal 300, and transmit the encoded signal to the first terminal 300. In operation 375a, the serving BS2 320 can encode the Walsh coordinated resources on the same location with the Walsh code w2 of the second terminal 325, and transmit the encoded signal to the second terminal 325.

Figure 8:
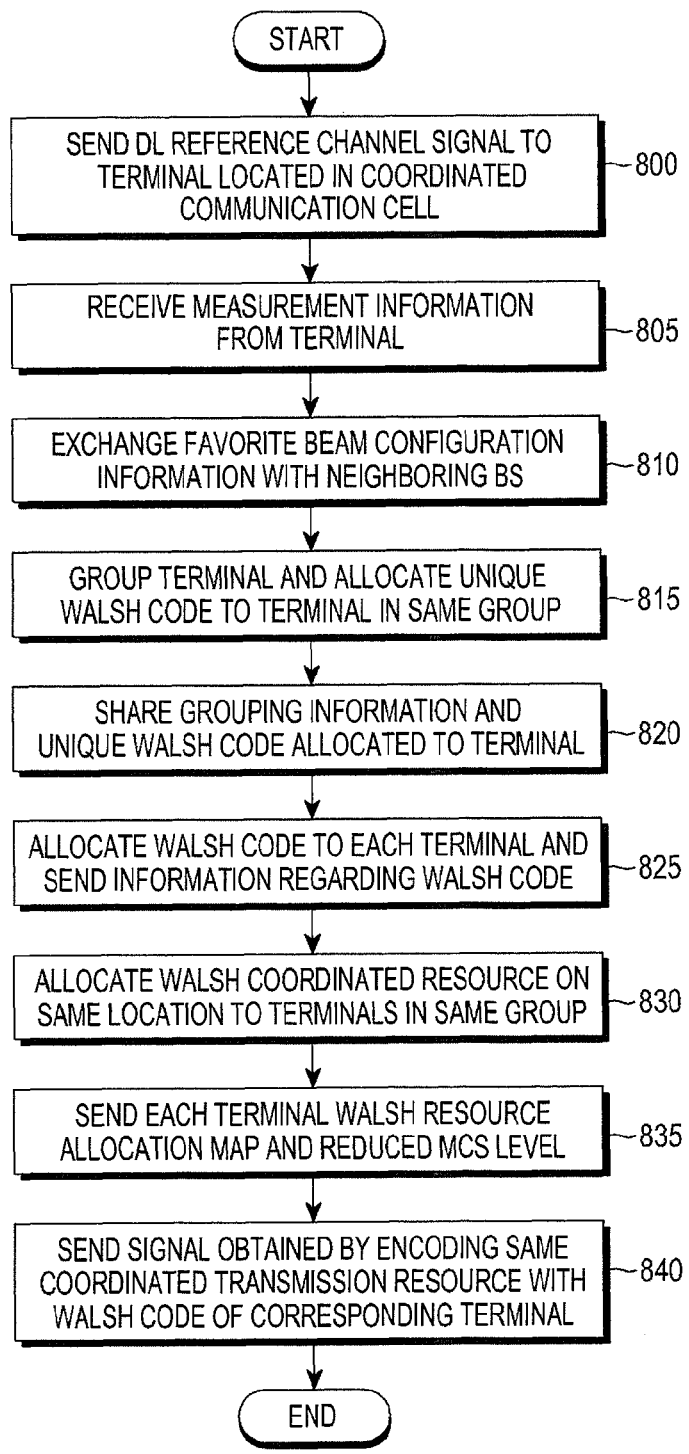
FIG. 8 is flowchart illustrating an example embodiment of operations of a BS according to this disclosure.

FIG. 8 is a flowchart illustrating an exemplary embodiment of operations of a serving BS, according to this disclosure. Referring to FIG. 8, in operation 800, the serving BS can send a DL reference channel signal to terminals within a coordinated communication cell to which the serving BS belongs. In operation 805, the serving BS can receive respective measurement information from the terminals. The measurement information can include at least one of SINR of a received signal of the terminal and favorite beam configuration information of the terminal based on the received signal strength.

In operation 810, the serving BS can exchange respective favorite beam configuration information of terminals with neighboring BSs. Specifically, the serving BS can send favorite beam configuration information of a particular terminal, which is obtained from the measurement information, to the neighboring BSs, and receive another favorite beam configuration information from each of the neighboring BSs. The neighboring BSs can include cooperative BSs included in the coordinated communication cell to which the serving BS belongs and BSs constituting a neighboring coordinated communication cell. In operation 815, the serving BS can determine whether to group interference-expected cell boundary terminals based on similarity of respective favorite beam configuration information obtained from neighboring BSs. If the condition as described in connection with operation 428 of FIG. 4 and operation 345 of FIG. 7 is met, the serving BS can determine to group terminals that satisfy the condition. After the grouping is complete, the serving BS can allocate unique Walsh codes to terminals in the same group.

In operation 825, the serving BS can share terminal grouping information regarding terminals grouped in the same group and Walsh code information regarding Walsh codes uniquely allocated to terminals in the same group with the neighboring serving BS or the cooperative BSs. In operation 830, the serving BS can allocate Walsh coordinated resources on the same location to terminals in the same group. In operation 835, the serving BS can send each terminal a Walsh resource allocation MAP, location information of the Walsh coordinated resources on the same location, and reduced MCS level. In operation 840, the serving BS can encode the Walsh coordinated resources on the same location with a Walsh code of the terminal and send the encoded signal to the terminal.

Figure 9:
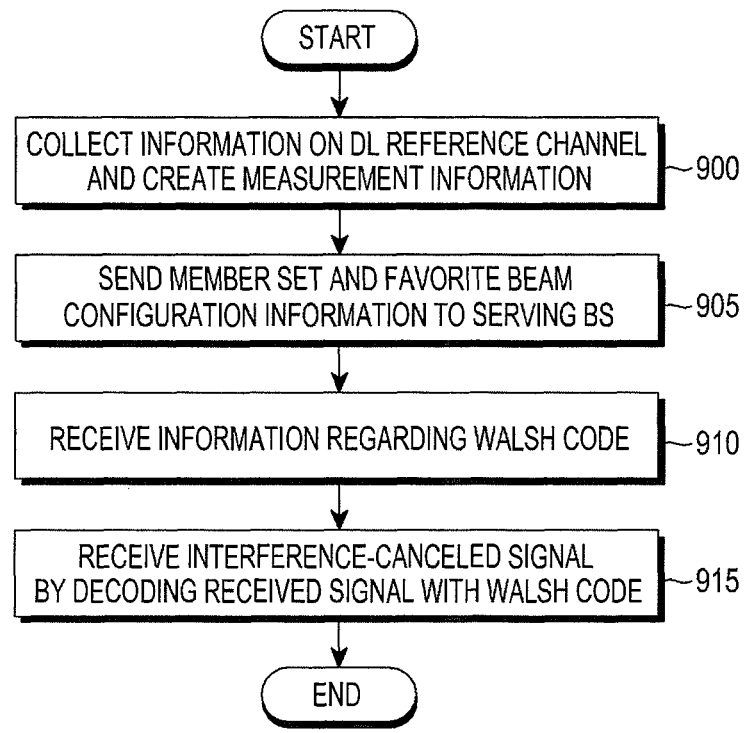
FIG. 9 is flowchart illustrating an example embodiment of operations of a terminal according to this disclosure.

FIG. 9 is flowchart illustrating an exemplary embodiment of operations of a terminal, according to this disclosure.

Referring to FIG. 9, in operation 900, the terminal can collect information on a DL reference channel and create measurement information. It is assumed that the DL reference channel is established with member BSs within the coordinated communication cell to which the terminal belongs. The measurement information can also include favorite beam configuration information of the terminal, which is based on SINR or received signal strength of a received signal at the terminal. In operation 905, the terminal can send the serving BS of the coordinated communication cell member set information regarding BSs that transmitted DL reference signals and favorite beam configuration information configured as described above. In operation 910, the terminal can receive information about a Walsh code allocated to the terminal from the serving BS. For example, assume that the terminal is an interference-expected cell boundary terminal and is determined by the serving BS to be a target terminal for Walsh coordinated scheduling, and is allocated a Walsh code that does not overlap any Walsh codes allocated to other terminals in the same group.

In operation 915, the terminal can receive an interference-free signal by decoding a signal received from any of member BSs with its Walsh code.

Figure 10:
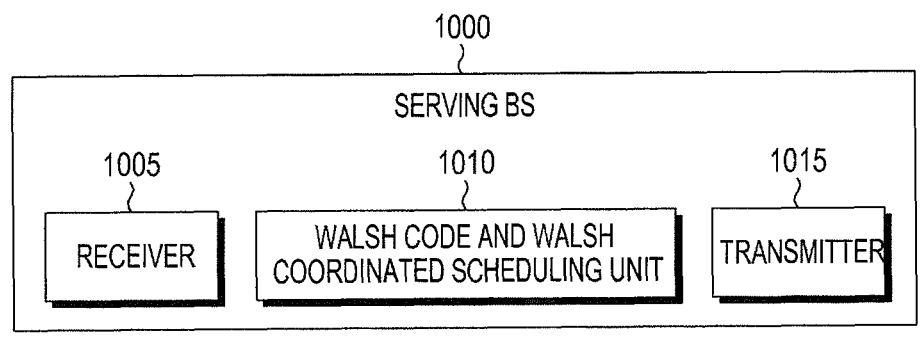
FIG. 10 is a block diagram illustrating an example embodiment of a serving BS according to this disclosure.

FIG. 10 is a block diagram illustrating an exemplary embodiment of a serving BS, according to this disclosure.

Referring to FIG. 10, the serving BS 1000 can include a receiver 1005, a Walsh code and coordinated transmission resource allocation unit 1010, and a transmitter 1015.

The receiver 1005 can receive respective measurement information from terminals within a coordinated communication cell to which the serving BS 1000 belongs. The transmitter 1015 can send a DL reference channel signal to the terminals.

The measurement information can also include favorite beam configuration information of the terminal, which is based on SINR or received signal strength of a received signal at the terminal.

The transmitter 1015 can exchange terminal information with neighboring BSs. Specifically, the serving BS 1000 can send favorite beam configuration information of a particular terminal, which is obtained from the measurement information, to the neighboring BSs, and receive another favorite beam configuration information from each of the neighboring BSs. The neighboring BSs can include cooperative BSs included in the coordinated communication cell of the serving BS 1000 and BSs constituting a neighboring coordinated communication cell.

The Walsh code and coordinated transmission resource allocation unit 1010 can determine whether to group interference-expected cell boundary terminals based on similarity between respective favorite beam configuration information obtained from the neighboring BSs. If the condition as described in connection with operation 428 of FIG. 4 and operation 345 of FIG. 7 is met, the serving BS can determine to group terminals that satisfy the condition. After the grouping is complete, the serving BS 100 can allocate unique Walsh codes to terminals in the same group.

The transmitter 1015 can then share grouping information regarding terminals grouped in the same group and Walsh code information regarding Walsh codes uniquely allocated to terminals in the same group with the neighboring serving BS or the cooperative BSs terminal by sending the information to the neighboring serving BS or the cooperative BSs. The Walsh code and coordinated transmission resource allocation unit 1010 can allocate Walsh coordinated resources on the same location to the terminals in the same group. The transmitter 1015 can then send each terminal a Walsh resource allocation MAP, location information of the Walsh coordinated transmission resources on the same location, and the reduced MCS level. The transmitter 1015 can encode the Walsh coordinated transmission resources on the same location with a Walsh code of the terminal and send the encoded signal to the terminal.

Figure 11:
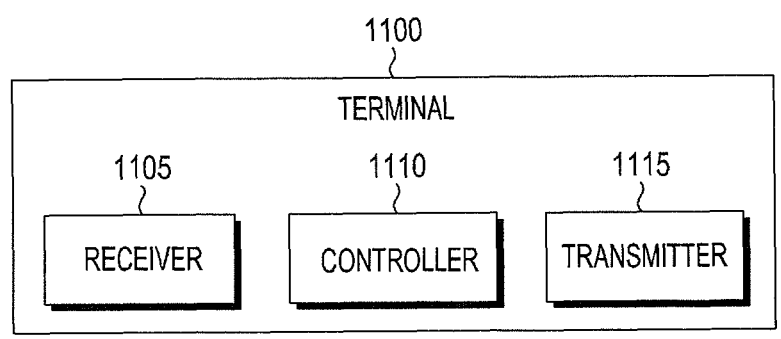
FIG. 11 is a block diagram of an example embodiment of a terminal according to this disclosure.

FIG. 11 is a block diagram of an exemplary embodiment of a terminal according to this disclosure.

Referring to FIG. 11, a terminal 1100 can include a receiver 1115, a controller 1120, and a transmitter 1125.

The controller 1120 can create measurement information based on signals collected on a DL reference channel. It is assumed that the DL reference channel is established with member BSs within the coordinated communication cell to which the terminal belongs. The measurement information can also include favorite beam configuration information of the terminal, which is based on SINR or received signal strength of a received signal at the terminal. The controller 1120 can control the transmitter 1125 to send the serving BS of the coordinated communication cell member set information regarding BSs that transmitted DL reference signals and favorite beam configuration information configured as described herein.

The receiver 1115 can receive information about a Walsh code allocated to the terminal from the serving BS. For example, assume that the terminal is an interference-expected cell boundary terminal and is determined by the serving BS to be a target terminal for Walsh coordinated scheduling, and is allocated a Walsh code that does not overlap any Walsh codes allocated to other terminals in the same group.

The controller 1120 can receive an interference-free signal by decoding a signal received from any of member BSs with the Walsh code of the terminal 1100.

According to embodiments of the present disclosure, in coordinated communications between multiple BSs (or CoMP communications), a method for inter-BS coordinated signaling, terminal grouping and associated coordinated (transmission) resource allocation using the flat frequency characteristics of mmWave-BF systems for terminals expected to suffer from mutual interference between two or more BSs is proposed, which improves the performance of terminals located around cell coverage boundaries and increases link reliability by efficiently canceling interference through symbol repetition based on the Walsh code length and Walsh encoding on the frequency axis in allocating coordinated resources.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to allocate a resource by a serving base station (BS) in a radio communication system, the method comprising:
    receiving, from a first terminal, first beam information comprising at least one first beam index selected by the first terminal, and receiving, from a second terminal, second beam information comprising at least one second beam index selected by the second terminal;
    determining whether there is at least one same beam index among the at least one first beam index and the at least one second beam index; and
    allocating respective dedicated resources to the first terminal and the second terminal,
    wherein the respective dedicated resources are selected from a resource region reserved for a coordinated communication, and
    wherein the serving BS provides the coordinated communication with at least one member BS to the first terminal and the second terminal.

2. The method of claim 1, wherein each of the at least one first beam index and the at least one second beam index, includes at least one transmission beam index among transmission beam indices of the serving BS and at least one transmission beam index among transmission beam indices of the at least one member BS.

3. The method of claim 1, wherein the resource region includes a dedicated code set, and a modulation and coding scheme (MCS) level set supporting code rates repeated on a symbol-level of a frequency axis based on lengths of dedicated codes in the dedicated code set.

4. The method of claim 1, further comprising:
    transmitting, to the at least one member BS, information on the respective dedicated resources allocated to each the first terminal and the second terminal.

5. The method of claim 1, further comprising:
    if a maximum value of receive signal strengths of a plurality of terminals to be provided the coordinated communication comprising the first terminal and the second terminal, is less than a threshold, determining to allocate the dedicated resources.

6. The method of claim 1, further comprising:
    if an interference of a terminal of the plurality of terminals provided with the coordinated communication is greater than an interference in an out coverage of coordinated communication, determining to allocate the dedicated resources.

7. A method to allocate a resource by a terminal in a radio communication system, the method comprising:
    receiving a reference signal from each of a serving BS providing a coordinated communication with at least one member BS to the terminal and the at least one member BS;

generating a first beam information comprising at least one first beam index selected based on the reference signals;

transmitting, to the serving BS, the first beam information, and receiving, from the serving BS, information related to a dedicated resource allocated to the terminal, wherein the dedicated resource is allocated if the first beam information comprises at least one same beam index as at least one second beam index selected by a second terminal, wherein the dedicated resources are selected from a resource region reserved for the coordinated communication.

8. The method of claim 7, wherein each of the at least one beam index and the at least one second beam index, includes at least one transmission beam index among transmission beam indices of the serving BS and at least one transmission beam index among transmission beam indices of the at least one member BS.

9. The method of claim 7, wherein the resource region includes a dedicated code set, and a modulation and coding scheme (MCS) level set supporting code rates repeated on a symbol-level of a frequency axis based on lengths of the dedicated codes in the dedicated code set.

10. The method of claim 7, wherein the information related to the dedicated resource is transmitted to the at least one member BS.

11. The method of claim 7, wherein if a maximum value of receive signal strengths of a plurality of terminals to be provided the coordinated communication comprising the first terminal and the second terminal, is less than a threshold, the allocation of the dedicated resource is determined.

12. The method of claim 7, wherein if an interference of a terminal of the plurality of terminals provided with the coordinated communication is greater than an interference in an out coverage of coordinated communication, the allocation of the dedicated resource is determined.

13. A serving base station (BS) to allocate a resource in a radio communication system, the serving BS comprising:

a transceiver configured to receive, from a first terminal, first beam information comprising at least one first beam index selected by the first terminal, and receive from a second terminal, second beam information comprising at least one second beam index selected by the second terminal;

a controller configured to determine whether there is at least one same beam index among the at least one first beam index and the at least one second beam index, and allocate respective dedicated resources to the first terminal and the second terminal, wherein the respective dedicated resources are selected from a resource region reserved for a coordinated communication, and wherein the serving BS provides the coordinated communication with at least one member BS to the first terminal and the second terminal.

14. The serving BS of claim 13, wherein each of the at least one first beam index and the at least one second beam index, includes at least one transmission beam index among transmission beam indices of the serving BS and at least one transmission beam index among transmission beam indices of the at least one member BS.

15. The serving BS of claim 13, wherein the resource region includes a dedicated code set, and a modulation and coding scheme (MCS) level set supporting code rates repeated on a symbol-level of a frequency axis based on lengths of dedicated codes in the dedicated code set.

16. The serving BS of claim 13, wherein the transceiver is configured to transmit, to the at least one member BS, information on the respective dedicated resources allocated to each the first terminal and the second terminal.

17. The serving BS of claim 13, wherein if a maximum value of receive signal strengths of a plurality of terminals to be provided the coordinated communication comprising the first terminal and the second terminal, is less than a threshold, the controller is configured to determine to allocate the dedicated resources.

18. The serving BS of claim 13, wherein if an interference of a terminal of the plurality of terminals provided with the coordinated communication is greater than an interference in an out coverage of coordinated communication, the controller is configured to allocate the dedicated resources.

19. A terminal to allocate a resource in a radio communication system, the terminal comprising:

a receiver configured to receive a reference signal from each of a serving BS providing a coordinated communication with at least one member BS to the terminal and the at least one member BS, and receive information related to a dedicated resource allocated to the terminal from the serving BS;

a controller configured to generate a first beam information comprising at least one first beam index selected based on the reference signals; and a transmitter configured to transmit, to the serving BS, the first beam information, wherein the dedicated resource is allocated if the first beam information comprises at least one same beam index as at least one second beam index selected by a second terminal, and wherein the dedicated resources are selected from a resource region reserved for the coordinated communication.

20. The terminal of claim 19, wherein each of the at least one beam index and the at least one second beam index, includes at least one transmission beam index among transmission beam indices of the serving BS and at least one transmission beam index among transmission beam indices of the at least one member BS.

21. The terminal of claim 19, wherein the resource region includes a dedicated code set, and a modulation and coding scheme (MCS) level set supporting code rates repeated on a symbol-level of a frequency axis based on lengths of the dedicated codes in the dedicated code set.

22. The terminal of claim 19, wherein the information related to the dedicated resource is transmitted to the at least one member BS.

23. The terminal of claim 19, wherein if a maximum value of receive signal strengths of a plurality of terminals to be provided the coordinated communication comprising the first terminal and the second terminal, is less than a threshold, the allocation of the dedicated resource is determined.

24. The terminal of claim 19, wherein if an interference of a terminal of the plurality of terminals provided with the coordinated communication is greater than an interference in an out coverage of coordinated communication, the allocation of the dedicated resource is determined.

* * * * *